E. E. PERKINS.
CAR BUNK.
APPLICATION FILED DEC. 8, 1911.
1,019,353.
Patented Mar. 5, 1912.
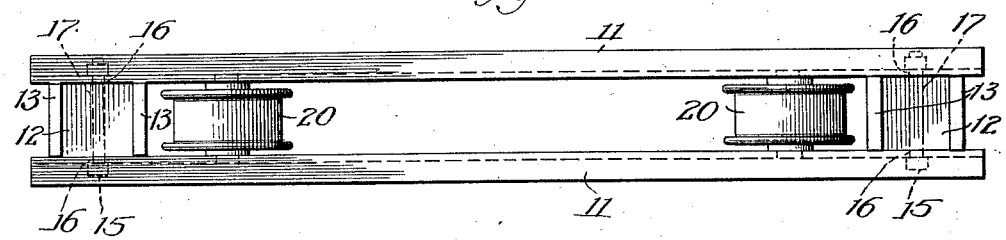
Fig. 1
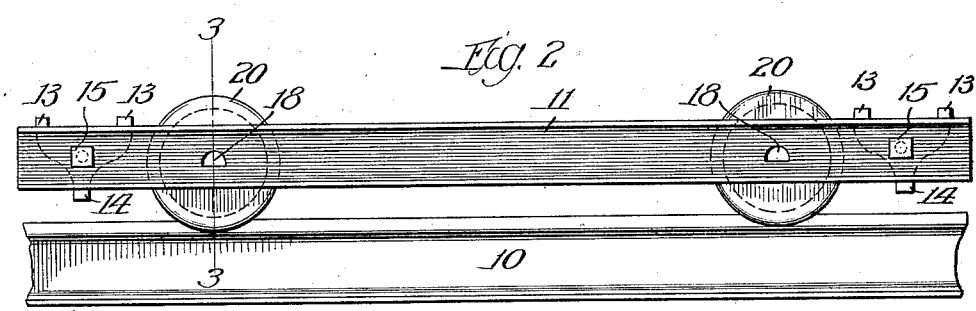
Fig. 2
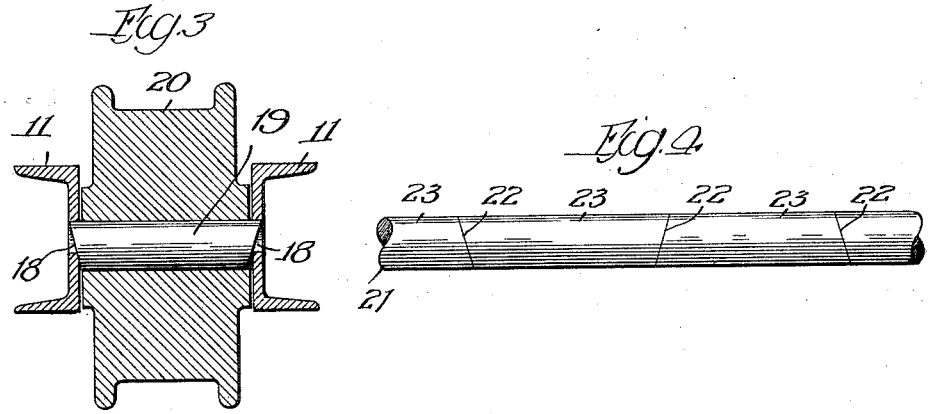
Fig. 3
Fig. 4
Witnesses:
Geo. R. Davison
Ira J. Wilson
Inventor
Elmer E. Perkins
by Lithicum Belt & Filler
Attys.

UNITED STATES PATENT OFFICE.

ELMER E. PERKINS, OF CHICAGO, ILLINOIS.

CAR-BUNK.

1,019,353.

Specification of Letters Patent.

Patented Mar. 5, 1912.

Application filed December 8, 1911. Serial No. 664,562.

*To all whom it may concern:*

Be it known that I, ELMER E. PERKINS, a citizen of the United States, residing at Chicago, in the county of Cook and State of Illinois, have invented certain new and useful Improvements in Car-Bunks, of which the following is a specification.

My invention relates to axles and means for securing them in place in general, and more particularly to devices of this class that are applicable to car bunks and vehicles wherein the wheels or rollers are mounted between two members, having the axle for the said wheels supported by and affixed to said members.

The axles in use at present in car bunks have the ends thereof milled to fit into receiving apertures in the side members of the car bunk. The milling of the ends of the axles, as well as the shaping of the apertures and side members to receive these ends, must be exceedingly accurate, and the fit perfect between the side members and the axle, or from the jarring caused by travel over the irregular tracks along which these vehicles move, slight rotary motion of the axle will result, giving rise to rattling, and causing wearing of the ends of the axles and their apertures. Consequently the life of the ordinary axle is very short, for the sharp edges necessary to the fit of the axle within the car bunk soon wear away, tending at the same time to cut and enlarge the apertures provided for the reception of these milled ends. Any play of the axle in the apertures of the side members soon destroys the entire structure, as the strain applied thereto comes from all angles at various times, and in a short time the side members become twisted or broken from the uneven action of the rollers.

To produce an axle of the type commonly in use in connection with car bunks, a bar of material circular in cross-section must have a portion at each end milled away to form one or more plane surfaces, and these ends fitted into accurately shaped apertures in the side members, the portion of the bar between the ends forming shoulders at its extremities, abutting against the side members. This necessitates a substantial and entirely disproportionate waste of material, which, taken in connection with the extreme care and accuracy required in milling the ends of the bar and in the shaping of the apertures has heretofore rendered the manufacture of axles for this use extremely expensive.

One of the principal aims of my invention is to produce an axle for a car bunk which while presenting a maximum strength will necessitate no waste of material in its manufacture, and which will automatically assume an accurate fit with the side members when the parts are assembled independent of the accuracy with which the apertures and ends of the axles are formed.

Another purpose of my invention is to construct a device of the class described which will require merely the sawing of the stock to produce the finished product.

Further aims and advantages will appear as the invention is better understood from the following description, which, taken in connection with the accompanying drawing, illustrates one embodiment thereof.

Referring to the drawing:—Figure 1 is a plan of a car bunk embodying my invention, Fig. 2 is a side elevation of Fig. 1, Fig. 3 is a vertical transverse section on the line 3—3 of Fig. 2, and Fig. 4 is an elevation of the stock from which an axle made in pursuance with my invention is produced, showing the manner of cutting the stock.

On the drawing, like reference characters refer to like parts throughout the various views.

As is well known to those versed in the art, a car bunk is designed to support one end of a pile of lumber, or material of varying lengths, and is adapted to travel along a single track 10 in conjunction with similar bunks traveling on similar tracks disposed beneath the lumber at various points throughout its length. It consists of the side members 11, which are for the purpose of illustrating my invention, shown as formed of two laterally disposed channel-irons, having their horizontal flanges disposed outwardly. These members are spaced apart at their ends by the Y-shaped spreaders 12, which have the lugs 13 extending above the upper horizontal surface of the said side members to retain the lumber or other material in position upon the car bunk. These spreaders are provided with the downwardly disposed legs 14 extending beneath the side members 11. The side members are secured to the spreaders 12, and to each other by the bolts 15, which pass through the apertures 16 and 17 of the side members and spreaders respectively, whereby the tightening of the bolts 15 rigidly binds the side members and the spreaders in fixed relation to form the framework of the car bunk. The side members 11 are provided with a plurality of axle-receiving apertures 28, preferably D-shaped or semi-circular in form, which are here shown as located midway between the outwardly disposed horizontal flanges of the channel-irons, but which may be located elsewhere if desired.

The axles 19 on which are rotatably mounted the rollers or wheels 20 have their ends cut obliquely preferably in converging planes. The outermost extremities of these axles protrude into and through the apertures 18, while the innermost edges, or the portion nearest the intersection of the converging planes, are located between the side members, and spaced from them below the apertures 18. Thus it will be seen that by merely positioning the axles with the rollers mounted upon them in the apertures 18 of the side members, the tightening of the bolts 15 will produce a permanent and self-adjusting fit between the axles and the side members, holding the former fixedly in position, while the spreaders prevent too great movement of the ends of the side members toward each other, whereby the side members would tend to belly outwardly, and release the axles. Should the axles wear slightly, it is only necessary to employ a correspondingly shorter spreader, while in the ordinary construction employing a milled axle it is necessary to discard the axles entirely, and replace them by new ones, as there is no way in which they can be refitted.

The axles employed in my present invention are made by sawing or cutting obliquely in a miter-box a bar 21 of material circular in cross-section, and of proper diameter along the lines 22 as shown in Fig. 4, thereby producing a plurality of axles 23. This is the only operation necessary to produce the finished axles, assuming that the circumferential surface of said bar is in condition to be used as a bearing surface. It is therefore obvious that the cost of an axle made in pursuance of my invention will not materially exceed the cost of the stock used for the purpose, as there is no waste, and the labor incidental to its production is negligible. A bar so cut may be placed within the roller, and the projecting ends thereof within the semi-circular openings 18 of the bars 11, whereby upon the tightening of the bolts 15 a permanent, efficient and accurate fit is automatically produced between the axles and the side bars. Should the axles become loose from wear, they may be refitted as hereinbefore described, or the ends thereof may be ground on a slightly different angle, to restore an accurate fit.

It is obvious that various alterations may be made in the size, shape and minor mechanical details of my invention without departing from the spirit or scope thereof, and without sacrificing any of its material advantages.

I claim:—

1. In a car bunk, the combination of a plurality of side members provided with axle-receiving apertures, an axle having inclined ends adapted to seat in said apertures, a wheel mounted on said axle, and means for compressing said side members against the ends of said axle.

2. In a car bunk, the combination of a plurality of side members provided with axle-receiving apertures, an axle having its ends cut at an angle to the longitudinal axis of said axle to provide acute angles adapted to project into the apertures in said side members, a wheel mounted on said axle, and means for holding said side members in engagement with the ends of said axle.

3. In a car bunk, the combination of side members provided with axle-receiving apertures, an axle having an acute angle at each end disposed in said apertures, and means for clamping the side members against the ends of said axle.

4. In a car bunk, the combination of side members, having a plurality of D-shaped openings therethrough, axles formed of material circular in cross-section, each having the ends thereof inclined to the axis of said axle, and adapted to engage said D-shaped openings, rollers mounted on said axles, and means for securing said side members together.

5. In a car bunk, the combination of side members, having a plurality of semi-circular openings therethrough, an axle formed of substantially circular stock, and having the ends thereof inclined to the axis of the axle, the outward portion of said ends being adapted to protrude into said semi-circular openings, a roller mounted on said axle, and means fastening the side members together.

6. In a car bunk, the combination of lateral members, having a plurality of semi-circular openings therethrough, transverse members located between the said lateral members to space them apart, means passing through said lateral members and said transverse members to fasten said lateral members and said transverse members together, axles formed of material circular in cross-section, each axle having the ends mitered toward each other whereby the upper portion of the axle is adapted to be retained in said semi-circular openings, and rollers mounted on said axles.

ELMER E. PERKINS.

Witnesses:
IRA J. WILSON,
M. A. KIDDIE.

Copies of this patent may be obtained for five cents each, by addressing the "Commissioner of Patents, Washington, D. C."